July 19, 1960  C. A. BUCHAN  2,945,426
FLY CUTTER TOOL
Filed July 2, 1956  2 Sheets-Sheet 1
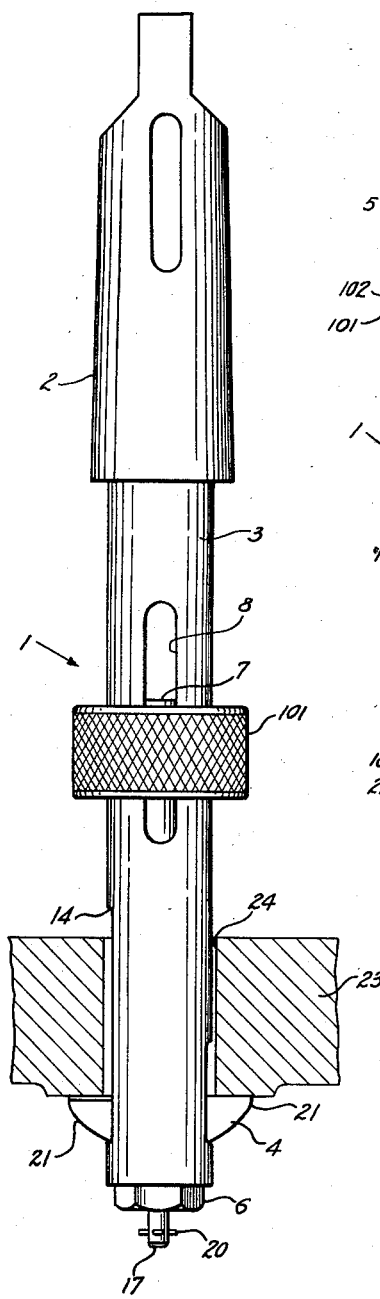
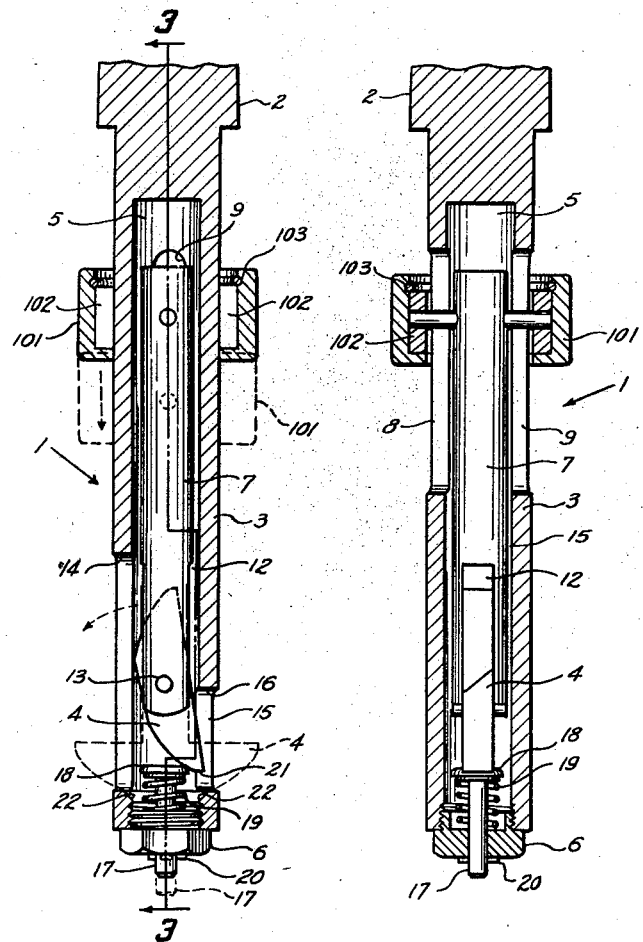
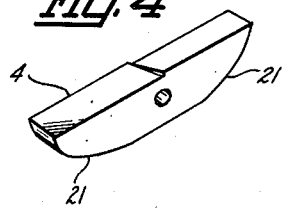
INVENTOR.
CLIFFORD A. BUCHAN
BY Flournoy Corey
ATTORNEY.

July 19, 1960     C. A. BUCHAN     2,945,426
FLY CUTTER TOOL

Filed July 2, 1956     2 Sheets-Sheet 2

INVENTOR.
CLIFFORD A. BUCHAN
BY Flournoy Corey
ATTORNEY.

United States Patent Office 2,945,426
Patented July 19, 1960

2,945,426

FLY CUTTER TOOL

Clifford A. Buchan, 1611 Fremont, Marshalltown, Iowa

Filed July 2, 1956, Ser. No. 595,191

1 Claim. (Cl. 90—11)

The present invention relates to a fly cutter tool and more particularly to a fly cutter tool to be attached to a lathe, radial drill, or the like to extend through a hole in a member or plate to spot face the underside of the member or plate.

It is an object of the invention among others to provide a fly cutter tool wherein a cutter blade is retracted when the cutter tool is passing through an opening to be entirely confined within the cutter tool and wherein the cutter blade is placed in operative position after the cutter blade has passed through the opening which allows for faster operation and greater safety.

It is a further object of the invention to provide a fly cutter tool wherein the cutter blade is retracted into inoperative position to allow the cutter tool to pass through an opening in a plate and after passing through the opening the cutter blade is forced into operative position with both operations taking place from above the plate and the cutter blade not touched by the operator and wherein the cutter blade may be replaced in a simple operation.

It is a still further object of the invention to provide a fly cutter tool that is both simple and economical in construction and operation; easy to operate, simple in design and economical to purchase.

In carrying out the objects of the invention there is provided a fly cutter tool consisting of a bar with a cutter blade movably mounted on a member reciprocal within the bar. There are means on the bar and attached to the reciprocal member, which may be a ring, slidably mounted on the bar and removably attached to the reciprocal member to move the reciprocal member up and down within the bar.

There are means associated with the bar and contacted by the cutter blade, as the reciprocal member moves upwardly within the bar, to swing the cutter blade entirely within the confines of the bar into inoperative position. The bar has slots through which the cutter blades extend to be in operative position, and there are means associated with one of the slots and contacted by the cutter blade as the reciprocal member moves upwardly within the bar, to swing the cutter blade into the bar.

One slot may be half the length of the other slot, with the cutter blade contacting that portion of the rod defining the top portion of the shorter slot as the reciprocal member moves upwardly within the bar to provide one means associated with one of the slots and contacted by the cutter blade to swing the cutter blade into the bar.

There are removable means on the bottom of the bar that are contacted by the cutter blade in the downward movement of the reciprocal member, to guide the cutter blade outwardly into operative position. The said reciprocal member and cutter blade are removable from the bar when disconnected from the ring, and the means on the bottom of the bar is removed. The means on the bottom of the rod is a nut threaded into the rod, which nut has a spring pressed piston member reciprocal within the nut and contacted by the cutter blade in its downward movement to guide the cutter blade outwardly into operative position. The slots in the bar, through which the cutter blade extends, terminate short of the end of the bar to provide seats for the cutter blade when the cutter blade is in operative position, with the cutter blade extending through the slots to be in operative position. The piston in the nut is pressed down when contacted by the cutter blade, and the cutter blade is supported on the seats at the bottom of the slots when the cutter blade is in operative position.

With the foregoing and other objects in view, the invention will be more fully described herewith and will be particularly pointed out in the claims appended hereto.

In the drawings, wherein like symbols refer to like or corresponding parts throughout the several views:

Figure 1 is an elevation view of the fly cutter tool, passed through an opening, and in operative position.

Figure 2 is a part sectional and part elevational view with some parts broken away.

Figure 3 is a sectional view taken on the line 3—3 of Figure 2.

Figure 4 is an elevational view of the cutter blade.

Figure 5:
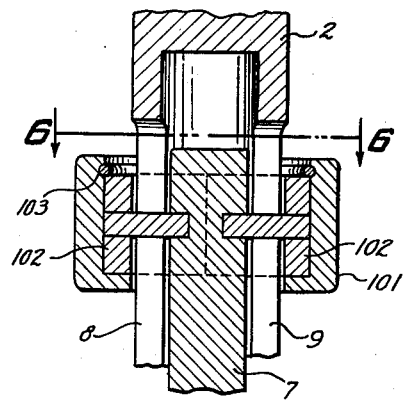
Figure 5 is an enlarged fragmentary view in section of the ring shown in Figure 3, and illustrating how the outer or floating ring may be held stationary while the inner ring rotates.
Figure 6:
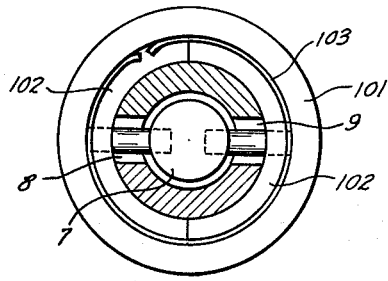
Figure 6 is a view in section taken along the line 6—6 of Figure 5.
Figure 7:
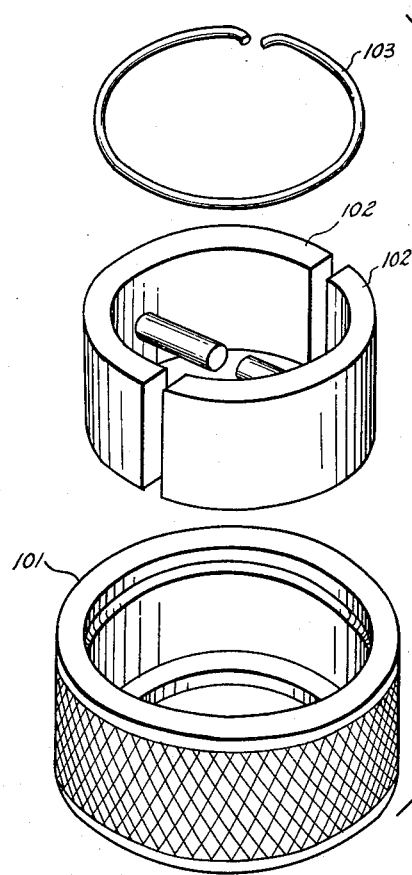
Figure 7 is a view in exploded relation of the locking ring, split ring, and floating ring, of Figures 5 and 6.

A reciprocal member 7 is mounted within the cylindrical portion 5 of the bar 3. Slots 8 and 9 are cut into the side wall of bar 3, in the upper portion of bar 3, and lead into the cylindrical portion 5. A ring member 102 is mounted on the outside of rod 3 and by a pin 11, which extends through ring 102, slot 8, the upper end of reciprocal member 7, slot 9, and the other side of ring 102, the reciprocal member 7 is removably connected to the ring 102. When ring 102 is grasped by the hand and moved up and down, the reciprocal member 7 will also be moved up and down with the movement of ring 102 and reciprocal member 7 guided in up-and-down movements by slots 8 and 9.

I preferably make the ring 102 with a floating, outer shell 101 which surrounds a split or two-part inner ring 102. The split ring 102 has inwardly projecting pins 11 to engage the reciprocal member 7, and a locking ring 103 to lock the shell 101 in rotatable relation on inner ring 102. By this structure, it is possible to reciprocate 7 without stopping the rotation of the fly cutter, and the cutter can be inserted and removed without stopping the device.

To the lower end of the reciprocal member 7 is attached the cutter blade 4. The lower end of the reciprocal member 7 is yoked, as shown at 12, and the cutter blade 4 is mounted on a pin 13 that extends through the yoke arms and the cutter blade.

The lower portion of rod 5 has a slot 14 therein, and directly opposite the slot 14 is a second slot 15. The slot 15 is half the length of the slot 14, and the two slots 14 and 15 provide space for the cutter blade to extend through in order to place the cutter blade 4 into operative position. The portion 16 of the bar 3, defining the upper end portion of the slot 15, is contacted by the cutter blade 4 when the reciprocal member 7 moves upwardly to swing the cutter blade 4 about the pin 13 to completely confine the cutter blade 4 within the rod 3. The ring 101 is grasped by the hand when the ring 101 is in the dotted line position of Figure 2. As the ring 101 moves upwardly, the reciprocal member 7 is also moved upwardly, which in turn moves the cutter blade 4 upwardly until the right side of the cutter blade 4 contacts the shoulder 16. Continued upward movement of the reciprocal member 7, when the cutter blade 4 contacts shoulder 16, will swing the right side of cutter blade 4 downwardly about pin 13, and the left hand side of cutter blade 4 upwardly until the whole cutter blade 4 is confined within the bar 3.

The nut 6, closing the bottom of bar 3, has a piston member 17 slidable in the nut 6, with a head portion 18 within the cylindrical portion 5 of the bar 3. Between the head portion 18 and nut 6 is a spring 19 to keep the piston 17 in an upward position. A pin 20 serves as a stop to prevent the piston 17 from being forced out of nut 6.

When the cutter blade 4 is in its upwardly position and entirely confined within the bar 3, downward movement of the ring 101 and reciprocal member 7 will force the cutter blade 4 into the operative position. The cutter blade 4 is rounded at 21 on each underside of the blade 4. The rounded underside 21 on the right side of the blade, in Figure 3, contacts the head portion 18 of the piston 17. The head portion 18 will start guiding the cutter blade 4 outwardly through slot 15, and the other side of the cutter blade 4 will extend through slot 14 until the cutter blade 4 extends outwardly from the bar 3.

Referring now to Figure 1; there is a plate 23 having an opening 24 drilled therethrough with a chamfer left on the underside of plate 23. The cutter tool 1, with cutter 4 retracted and entirely confined within the bar 3, can be entered into opening 24 and passed therethrough. After the cutter tool 1 has extended a sufficient distance through the opening 24, the ring 101 is pushed down, thus moving reciprocal member 7 downwardly with cutter blade 4 contacting the head 18 of piston 17. The cutter blade 4 is then directed outwardly, and continued movement of ring 101 makes the cutter blade 4 perpendicular to the bar 3.

With the cutter blade 4 swung outwardly, the cutter tool 1 is now pulled upwardly until the cutter blade 4 contacts the underside of the plate 23. Continued upward movement of the cutter tool 1 with cutter blade 4 contacting the surface of plate 23, will force piston 17 and head 18 downwardly in nut 6, thus compressing the spring 19, and the cutter blade 4 will seat on seats 22, which seats 22 are provided by that portion of the bar 3 defining the bottoms of slots 14 and 15. With the cutter blade 4 so seated, the cutting tool 1 can now be rotated to cut any burrs away from the bottom of hole 23.

When the cutting operation is concluded, the cutting tool 1 may be dropped in opening 24 until the ring 101 contacts plate 23, after which continued downwardly movement of cutting tool 1, forces ring 101 upwardly and cutter blade 4 into the retracted position, entirely confined within the rod 3, and the cutter tool 1 can now be removed from opening 23 and is ready to be entered into another opening. Ring 101 may also be moved upward by hand.

The spring 19, when compressed, stores up energy to move the cutter blade 4 upwardly when the cutter blade 4 is no longer cutting. This does not allow the cutter blade 4 to stick and makes it easier for the cutter blade 4 to be swung in and out. The head 18, being movable when contacted by cutter blade 4 in its downward movement, will insure that the cutter blade 4 will be swung out at all times.

To change cutter blade 4, the nut 6 carrying piston 17 is removed from bar 3. The reciprocal member 7 is moved upwardly until the cutter blade 4 is in retracted position. The pin 11 is now removed, hence ring 101 and reciprocal member 7 are separated from each other. The reciprocal member 7 and cutter blade 4 are removed from the bottom of bar 3, and either a new reciprocal member 7 with cutter blade 4 may be inserted, or a new cutter blade 4 may be attached to the reciprocal member 7.

It will be understood that the invention has been described for purposes of illustration and explanation, and that changes and variations are possible without departing from the scope of the invention; all such modifications and changes are intended to be included in the appended claim.

I claim as my invention:

A fly cutter tool comprising an elongated tool holder having bifurcated end portions at one end and oppositely disposed pin receiving recesses in sides thereof adjacent the other end, a cutter blade received between the bifurcated end portions and pivotally secured thereto at one end of the bifurcations, a cylindrical bar in which said holder is axially adjustable, said cylindrical bar having parallel cutter blade receiving slots longitudinally disposed on either side of its lower end and terminating in seats at their bottom ends, said cylindrical bar also having a pair of oppositely disposed elongated pin receiving slots extending lengthwise in the upper portion thereof, a pair of semi-cylindrical sleeves having inwardly extending pin means thereon extending through said pin receiving slots and into said respective pin receiving recesses in the tool holder as said sleeves are placed about said cylindrical bar, a ring member received over said cylindrical bar and housing said pair of semi-cylindrical sleeves and a readily detachable lock means for securing said ring on said sleeves, a closure plug closing the lower end of the cylindrical bar, a spring pressed piston member reciprocal axially within the plug and adapted to be contacted by said cutter in its downward movement whereby the cutter is guided in pivoting outwardly in said cutter blade receiving slots to dispose the cutting edges of the cutter blade on either side of the cylindrical bar, said spring pressed piston yielding downwardly to permit the cutter blade to move downwardly into seating engagement with said seats at the bottom of said blade receiving slots, the top edge of one of said slots in the cylindrical bar being lower than the top edge of the other of said slots so that as said tool holder is raised the cutter blade engages said lower edge to pivot and retract into said cylindrical bar.

References Cited in the file of this patent

UNITED STATES PATENTS

| | | |
|---|---|---|
| 2,299,528 | Conner | Oct. 20, 1942 |
| 2,438,558 | Hollander | Mar. 30, 1948 |
| 2,620,689 | Cogsdill | Dec. 9, 1952 |
| 2,773,402 | Edens | Dec. 11, 1956 |